United States Patent
Marshall et al.

(10) Patent No.: US 9,049,044 B1
(45) Date of Patent: Jun. 2, 2015

(54) METHOD OF MANAGEMENT AND DISTRIBUTION OF DEVICE ADAPTERS FOR ELEMENT MANAGEMENT SYSTEMS

(75) Inventors: Brent Marshall, Kanata (CA); Frank Meijer, Ottawa (CA); Paul Mossman, Kanata (CA); Bryan Strickland, Raleigh, NC (US)

(73) Assignee: Avaya, Inc., Basking Ridge, NJ (US)

( * ) Notice: Subject to any disclaimer, the term of this patent is extended or adjusted under 35 U.S.C. 154(b) by 2077 days.

(21) Appl. No.: 11/393,409

(22) Filed: Mar. 30, 2006

Related U.S. Application Data

(60) Provisional application No. 60/679,896, filed on May 11, 2005.

(51) Int. Cl.
  *G06F 15/16* (2006.01)
  *G06F 9/445* (2006.01)
  *H04L 12/433* (2006.01)
  *H04L 12/42* (2006.01)

(52) U.S. Cl.
  CPC .............. *H04L 12/433* (2013.01); *H04L 12/42* (2013.01)

(58) Field of Classification Search
  USPC .......................................................... 709/218
  See application file for complete search history.

(56) References Cited

U.S. PATENT DOCUMENTS

| | | | |
|---|---|---|---|
| 7,685,257 B2 * | 3/2010 | King et al. ..................... | 709/219 |
| 2003/0065755 A1 * | 4/2003 | Gunji ............................. | 709/221 |
| 2003/0120822 A1 * | 6/2003 | Langrind et al. .............. | 709/251 |
| 2006/0101456 A1 * | 5/2006 | Crosier et al. ................. | 717/174 |

* cited by examiner

*Primary Examiner* — Emmanuel L Moise
*Assistant Examiner* — Mahran Abu Roumi
(74) *Attorney, Agent, or Firm* — Christopher & Weisberg, P.A.

(57) ABSTRACT

A system and method for managing network elements in a communication network. The system includes a storage unit for storing one or more cartridges, where the one or more cartridges contain network element-specific information. The storage unit also contains a generic framework for managing the one or more network elements via use of the one or more cartridges. Finally, the storage unit includes a processor for using the one or more cartridges and the generic framework to manage the one or more network elements.

15 Claims, 7 Drawing Sheets

METHOD OF MANAGEMENT AND DISTRIBUTION OF DEVICE ADAPTERS FOR ELEMENT MANAGEMENT SYSTEMS

CROSS-REFERENCE TO RELATED APPLICATIONS

This application is related to and claims priority to U.S. Provisional Patent Application Ser. No. 60/679,896, filed May 11, 2005 entitled METHOD OF MANAGEMENT AND DISTRIBUTION OF DEVICE ADAPTERS FOR ELEMENT MANAGEMENT SYSTEMS, the entirety of which is incorporated herein by reference.

FIELD OF THE INVENTION

The present invention relates to the field of network equipment management, and more particularly to a method and apparatus for managing network elements.

BACKGROUND OF THE INVENTION

There are two classical approaches to providing element management functionality for network elements: thick clients and thin clients. The thick client approach involves the creation of a custom piece of software (Element Manager) for the management of a particular device. The Element Manager contains all of the knowledge of what data items are accessible for a particular type and version of the network element, how to present them to the user, and how to access them via a selected protocol.

A problem that may arise with the thick client approach is that a separate thick client is required for each type of device, and potentially for each version of each type of device. A multitude of separate clients becomes difficult for the user to manage. To combat this, a unified client can be created which supports all versions of all devices, but this will require frequent releases of upgraded Element Managers to the customers, which they must install regardless of whether they have the type of network element for which the upgrade was issued. It also requires the coordination of Element Manager releases between multiple network element projects and teams. In any case, the thick client approach makes it difficult to track and manage the element management software which is required for a given customer's network, and increases the likelihood of mistakes such as attempting to manage a device with the wrong Element Manager.

The thin client approach involves having a very generic front end client (such as a web browser), and having all of the element specific knowledge embedded on the network element itself (for example in CGI scripts or Java Servlets running behind a web server). This approach offloads the issue of dealing with different device types and versions from the client; however, it introduces problems of its own. It places an increased burden on the network element's resources such as processing power, memory usage, etc. Furthermore, this approach requires greater client to network element messaging traffic, which increases latency at the user interface, particularly if the management is occurring across a slow connection such as a modem. It also makes it very difficult to enforce a standardized look-and-feel across different network elements.

Therefore, what is needed is an improved system and method for managing network elements that mitigates at least one of the aforementioned problems associated with known equipment management methods.

SUMMARY OF THE INVENTION

The present invention describes an apparatus and method which advantageously allows the content, presentation, and protocol necessary to manage a network element to vary over different types and versions of network elements, without requiring different clients to be used. The method and apparatus disclosed herein, simplifies the distribution of network element specific element management software by making that software intrinsic to the element itself, but without requiring a separate Element Manager for each network element type. This eliminates the need to track and manage the versions of element management software which are required by different customers for their networks. The invention also simplifies the information flow between network element and element management client to the minimum necessary to convey the actual management data by offloading presentation functionality to the client, thereby enhancing the responsiveness of the user interface when compared with a thin client solution.

By allowing a degree of consistency in the presentation of information between network elements, even though the data itself may vary between network elements, the present invention makes it easier to install, maintain, and manage a variety of network elements (or versions of the same network element), which may come from a single supplier or be provided by multiple different suppliers. The present invention simplifies the distribution of Element Manager enhancements, essentially making it transparent to the network administrator, thus reducing the time spent managing versions of software.

The present invention additionally eliminates the need to track, manage, and distribute the versions of element management software which are required by a particular customer for their network and eliminates network administrator mistakes such as attempting to manage a network element using the wrong version of Element Manager.

The methods described herein may be performed by software in machine readable form which may be stored on a storage medium. The software, which runs on or controls "dumb" or standard hardware, carries out the desired functions via use of a processor and therefore, essentially defines the functions of the register, and can therefore be termed a register, even before it is combined with its standard hardware. For similar reasons, it is also intended to encompass software which "describes" or defines the configuration of hardware, such as HDL (Hardware Description Language) software, as is used for designing silicon chips, or for configuring universal programmable chips, to carry out desired functions.

According to one aspect of the invention, a network element management system for managing network elements in a communication network is provided. The system includes a storage unit for storing one or more cartridges, where the cartridges contain network element-specific information, and a generic framework for managing the one or more network elements via use of the one or more cartridges. The storage unit also includes a processor for using the one or more cartridges and the generic framework to manage the one or more network elements.

According to another aspect, the present invention provides a method of managing network elements in a communication network. The method includes the steps of coupling a generic framework to a selected network element, and querying the network element to determine the identity of an element-specific cartridge, the cartridge containing network element-specific information. The framework connects to and manages the selected network element via use of the installed cartridge.

In yet another aspect, the present invention provides a storage medium storing a computer program which, when executed by a processing unit, performs a method for managing network elements in a communication network. The method includes the steps of coupling a generic framework to a selected network element, and querying the network element to determine the identity of an element-specific cartridge, the cartridge containing network element-specific information, and determining if the generic framework contains the cartridge. The framework connects to and manages the selected network element via use of the installed cartridge.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention are described in the figures by way of example only. These examples represent the best ways of putting the invention into practice that are currently known to the Applicant, although they are not the only ways in which this could be achieved. The invention disclosed herein provides a means for allowing a single generic thick client to be used as an Element Manager for a variety of heterogeneous network elements. It does this by encapsulating all of the network element specific presentation and messaging functionality into a single bundle called a "cartridge". The contents of the cartridge vary from one type of network element to another, and across different versions of the same network element.

Figure 1:
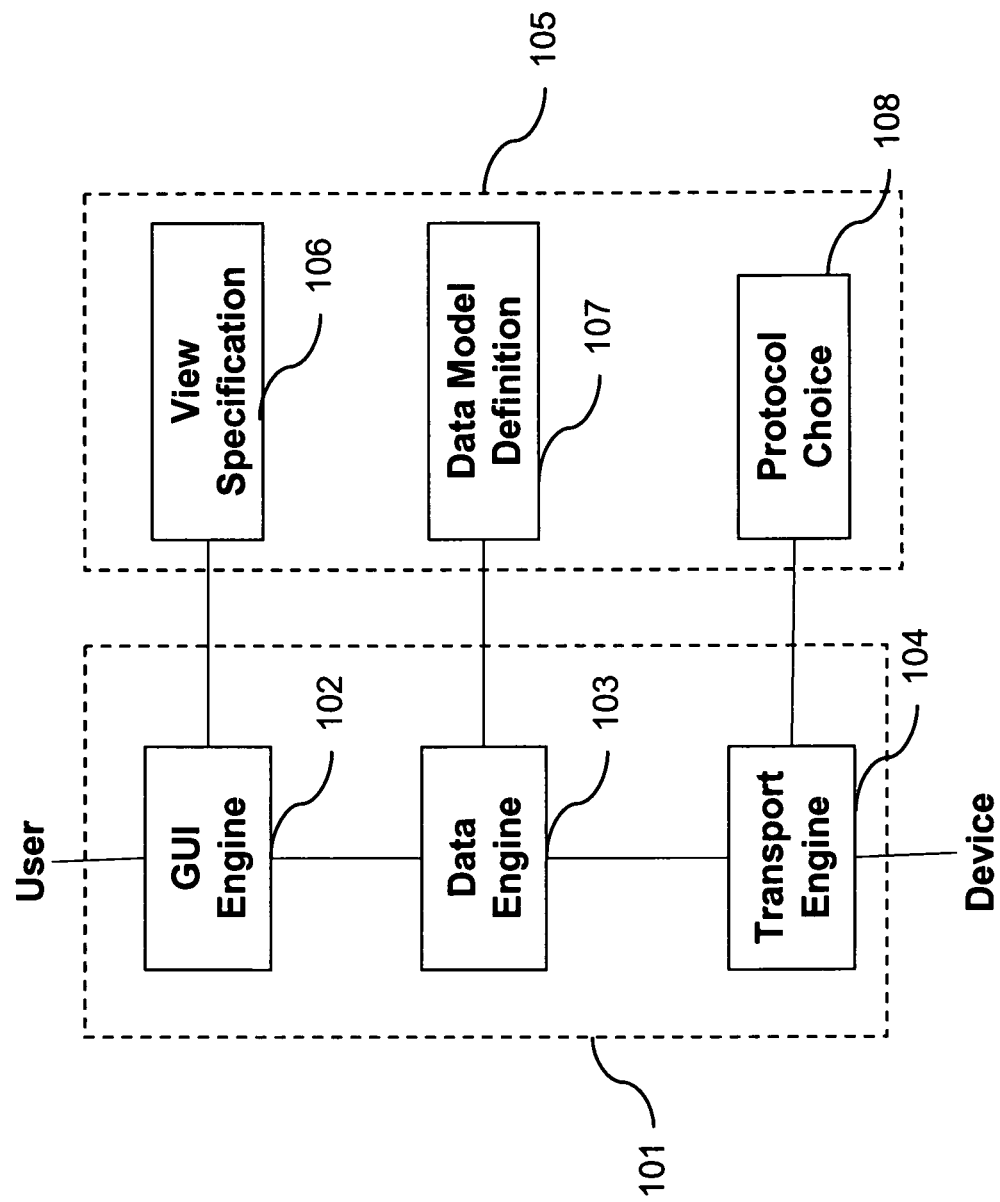
FIG. 1 is a schematic diagram of the element management apparatus of the present invention.

Referring now to the drawing figures in which like reference designators refer to like elements, there is shown in FIG. 1, a system constructed in accordance with the principles of the present invention. FIG. 1 shows a simple schematic diagram of an element management apparatus according to the present invention. The client, which is also referred to as the Framework 101, is generic, i.e., it can be used to manage any network element and is not specific to any type of element.

Framework 101 is defined as a set of software components that are used to build element management systems. Framework 101 may contain several functional blocks, such as the GUI (Graphical User Interface) Engine 102, which manages all components responsible for user interaction and presents a unified graphical user interface across different element types, the Data Engine 103, which maintains a "data model", i.e., a temporary representation of the managed network elements and which manages the retrieval and update of management data with the network elements, and the Transport Engine 104, which provides a consistent API (Application Program Interface) for the storage and retrieval of data, independent of the protocol or other means used to perform the operation. "Data model" is defined as a temporary storage of a device's configuration data within the management system.

Framework 101 also includes the software (not shown in FIG. 1) for managing the network element-specific Cartridge 105. The Element Manager Framework 101 has the ability to connect to and manage a variety of network element types with the aid of the device specific cartridge. "Cartridge" is defined herein as a software module containing all device specific functionality. Cartridge 105 is dynamically or statically loaded by the Framework 101 to enable configuration of a specific platform or version.

The Cartridge 105 provides the Framework 101 with the element specific information and comprises all aspects of element management which are specific to a particular network element. Cartridge 105 may contain several elements, such as the View Specification 106, which describes the look and behavior of the GUI. View Specification 106 is a description of the user-facing components of the model (also referred to as the UI model). Cartridge 105 may also contain a Data Model Definition 107, which is a specification of the nature and the structure of that data. Data Model Definition 107 describes the device components, the relationship between these components, and a specification of the data which may be viewed or modified on the network element. "Device" shall be defined herein as a network element, or physical entity being provisioned, monitored or configured.

Cartridge 105 may also include a Protocol Choice 108, which details the protocol which should be used to communicate with the network element and is capable of converting a generic request to retrieve or modify specific data items on the device into network element-specific protocol interactions with the device. Protocol Choice 108 may either be an indication of what protocol to use, or an actual implementation of the protocol. This implementation of Cartridge 105 allows the protocol, Data Model Definition 107, and presentation to vary as required between different types of network elements. Cartridge 105 may comprise code or, alternatively, Cartridge 105 may comprise a high level description rather than code. The use of high level description rather than code is beneficial because it makes Cartridge 105 more compact.

By separating out the generic aspects and the element specific aspects, it is not necessary to know in advance what versions of equipment Framework 101 will need to manage. Framework 101 can be shipped with or without Cartridges 105 as described below. Cartridge 105 is a "read-only" source of information for Framework 101. Framework 101 and Cartridge 105 are each described in greater detail below.

Figure 2:
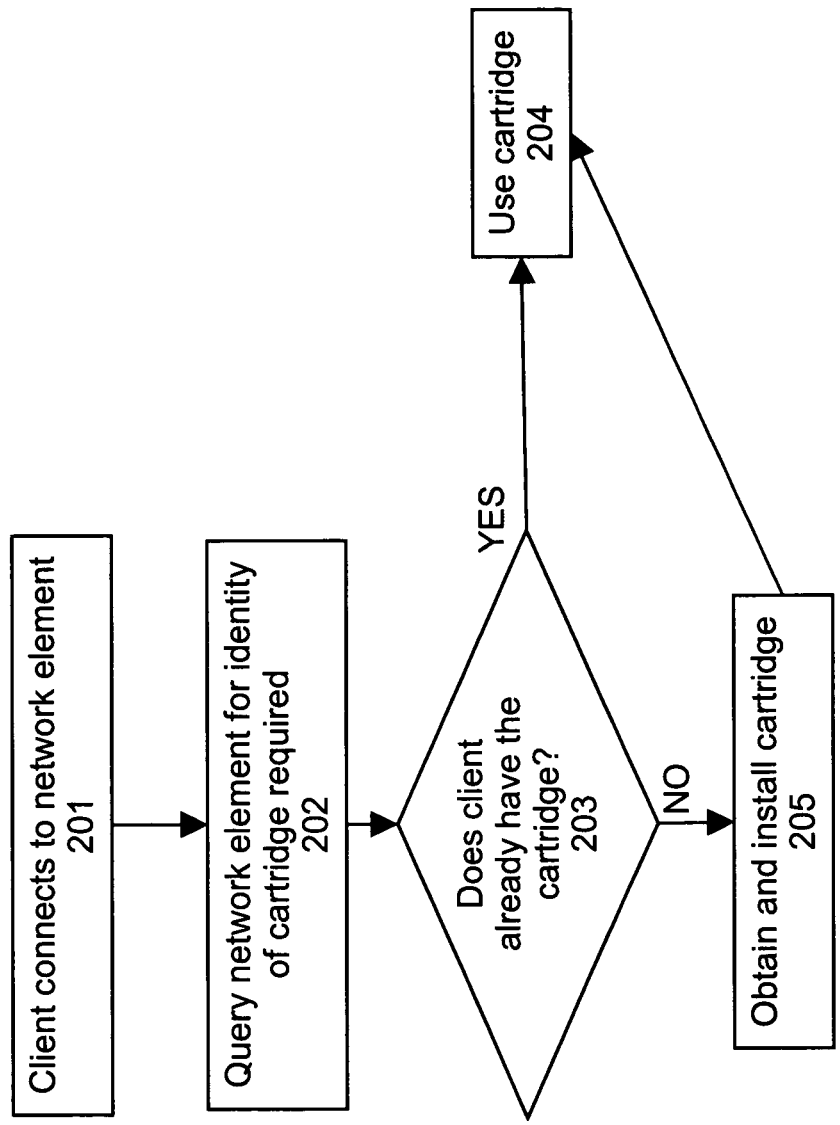
FIG. 2 is a simple flow diagram of the element management method of the present invention.

FIG. 2 shows a simple flow diagram of an element management method according to the present invention. When the generic client initially connects to a network element in order to manage it, (step 201), the first step is to query the network element to determine the identity of the Cartridge 105 which is needed to manage the device (step 202). The identity of the Cartridge 105 may be specified, for example, by an identifier or by the combination of a cartridge identifier and a version identifier. The client determines whether it already has this Cartridge 105 (step 203) in which case it merely uses it (step 204), e.g., it automatically starts running the required Cartridge 105, without requiring any user interaction.

However, in the case where Cartridge 105 is not already present in the client, it will proactively obtain and install the necessary Cartridge 105 (step 205). This may again be without requiring any user interaction, or it may require a simple confirmation (e.g. OK/Cancel dialog boxes) by the user. Cartridge 105 may be obtained, for example, by downloading it from the network element in question, or from a web server or from any other suitable source. Cartridge 105 could alternatively be provided with the equipment on a computer readable medium. As described above, the element management Framework 101 may contain cartridge management software which performs the checks as to whether it has that Cartridge 105.

The method described above guarantees that the correct version of Cartridge 105 is always used to manage a particular network element. It also means that there is no need to manually, or by any other process, track the version of element management software which is required by different customers for their networks. Customers will automatically have the correct version of software to manage the equipment which is installed in their networks. By allowing multiple different Cartridges 105 to simultaneously exist within the same Element Manager, that client may be used to manage multiple different device types and/or device versions without requiring Cartridge 105 to be downloaded each time the device type or version is switched. This minimizes the time required to switch between network element types and versions.

Furthermore, Framework 101 can be designed to contain most (e.g. about 90%) of the software required for the Element Manager, with only a small proportion being network element specific and provided in the Cartridge 105. This results in a quick download time when the Framework 101 accesses the Cartridge 105 for the first time.

Figure 3:
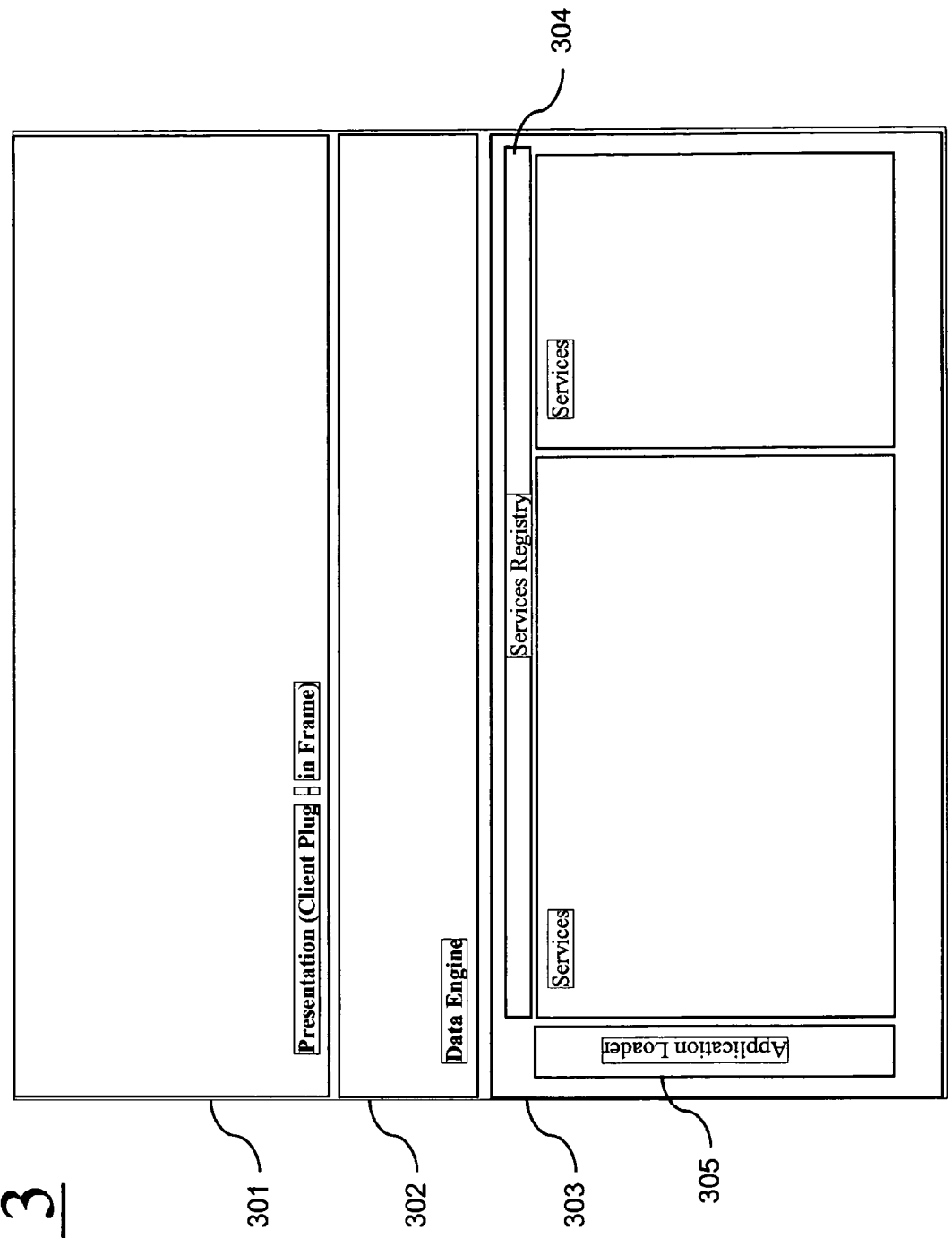
FIG. 3 is a high-level view of the framework architecture of the element management method of the present invention.

A more detailed implementation of Framework 101 and Cartridge 105 according to the present invention is described, by way of example only, with reference to FIGS. 3 through 6. FIG. 3 contains high-level view of the framework architecture. Note that a system built from Framework 101 may exist as a single process or as a client/server application. A Presentation Layer 301 manages all components responsible for user interaction. It creates and maintains control widgets in the menu and toolbars, and creates context switching panels, tree views, table views and tabbed details views. Presentation Layer 301 provides for creating and supporting multiple views for the same data. Presentation Layer 301 consists of the modules provided by Framework 101, but can be extended with elements defined in device specific Cartridges 105. Presentation Layer 301 is driven, in part, by the View Specification 106 from the device-specific Cartridge 105.

Data Engine 302 maintains a "data model", i.e., a temporary representation of the managed network elements. Data Engine 302 creates the data model based on the information provided via configuration protocol or retrieved from off-line database. Data Engine 302 manages the modification of the data model, which involves creating new objects, deleting existing objects, modifying properties of the objects, and invoking operations on the objects. Objects are defined herein as an instance of a particular class in the data model, containing values for each of the fields of that class. Each class may have zero or more instances. Data Engine 302 handles initial verification and validation of user actions. Data Engine 302 is driven, in part, by the Data Model Definition 107 from Cartridge 105.

Services registry 304 is a software bus allowing for registering services extending Framework 101. The services registry interface provides a mechanism for naming services and also provides a mechanism for looking up services and obtaining handles to services in a location-independent way. This provides an abstraction that allows clients to look up services and obtain handles to services for both in-process (local) and out-of-process (remote) cases. Such an abstraction is useful for systems built as client/server applications.

Application Loader 305 is the component that assembles the management application when it is launched. Application Loader 305 uses application description provided by developers to select and initialize the data engine and establish the Presentation Layer 301. It connects additional services by locating them and registering them with service registry.

Figure 4:
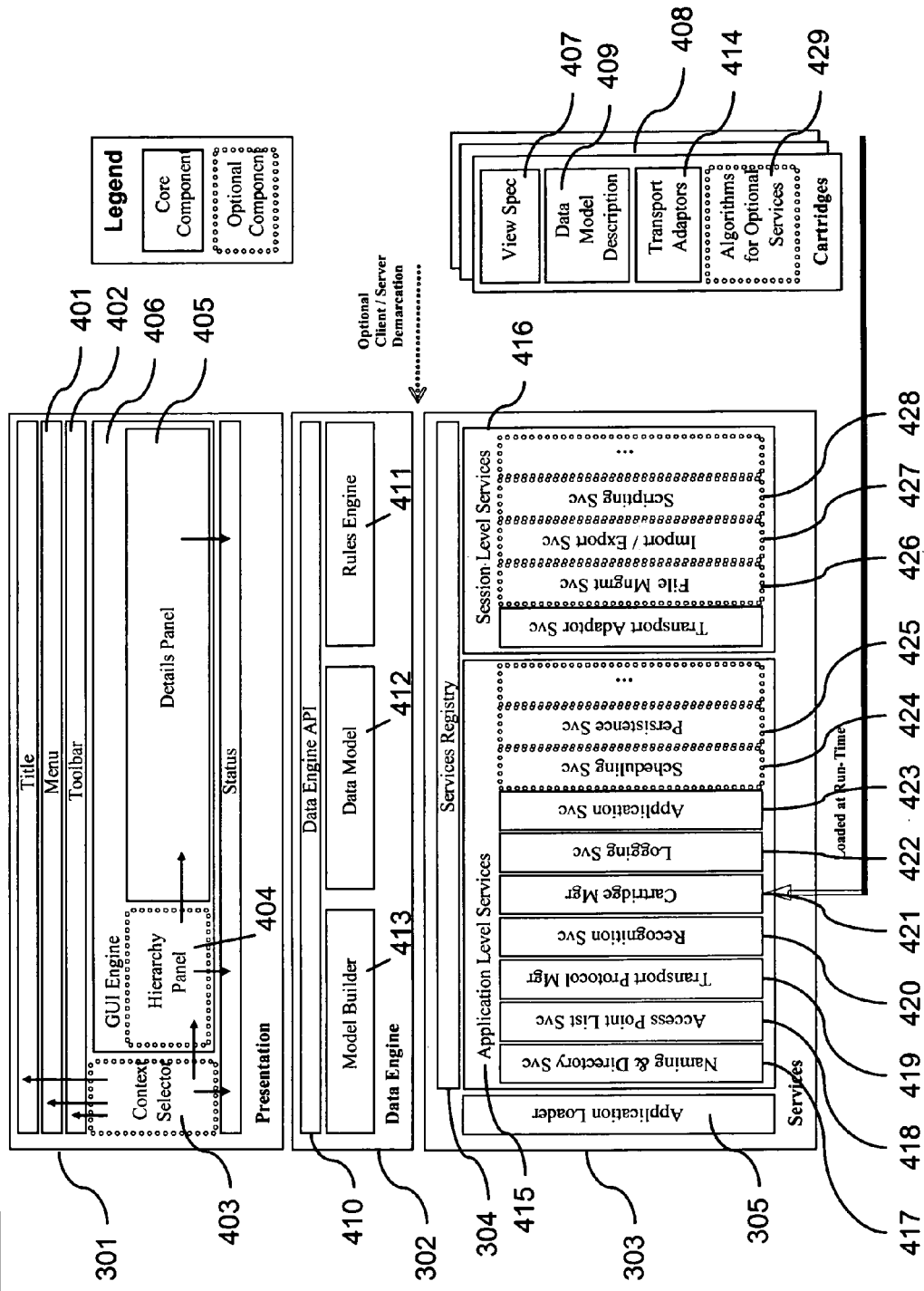
FIG. 4 shows a more detailed level view of the framework architecture shown in FIG. 3.
Figure 7:
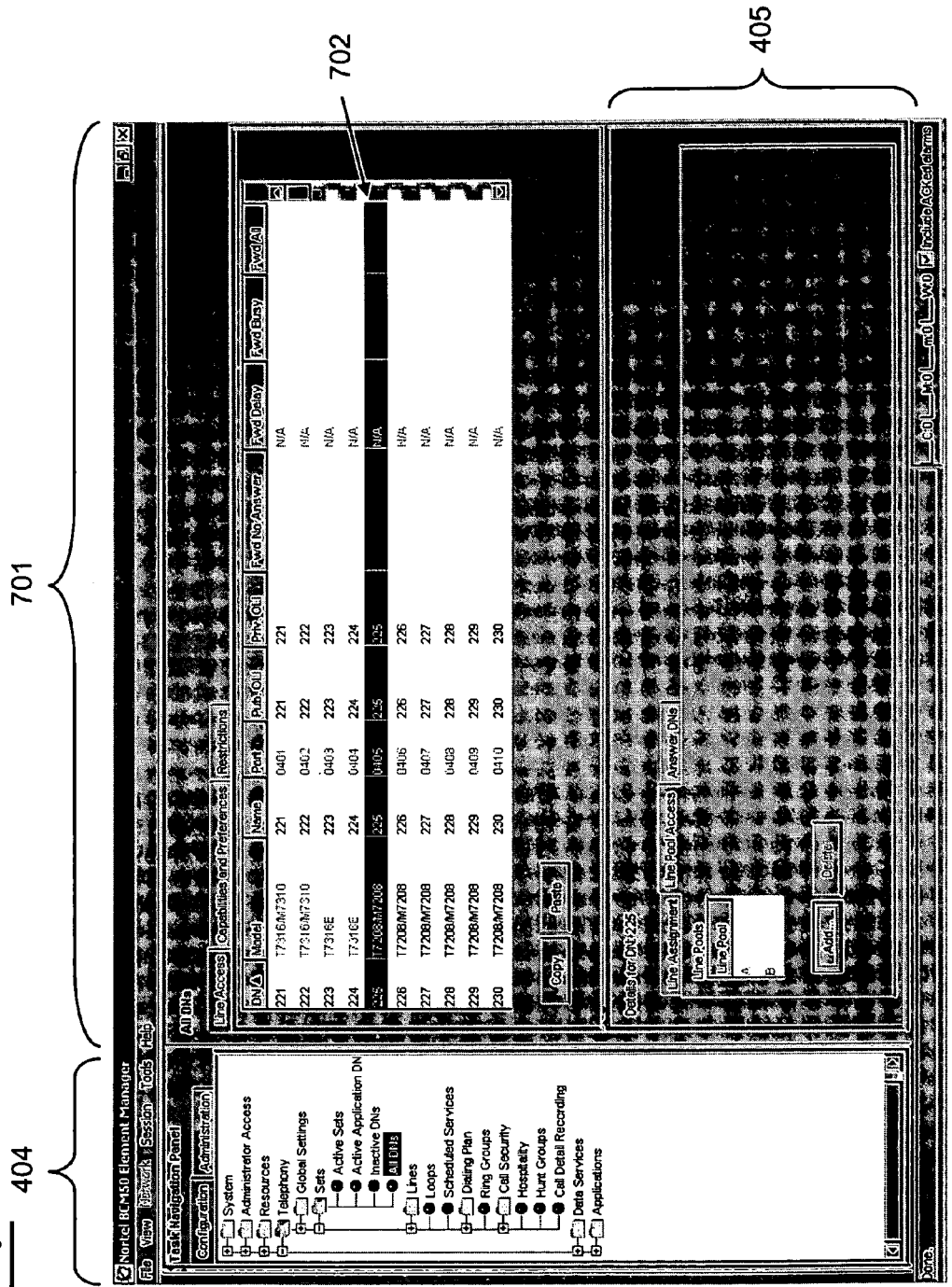
FIG. 7 is a screen shot of an exemplary graphical user interface incorporating the present invention.

FIG. 4 shows a more detailed level view of the architecture shown in FIG. 3 and is described below with additional reference to FIG. 7, which shows a screen shot of an example GUI. The arrows in FIG. 4 represent the control flow in the user Interface (UI). Selecting "Context" determines the structure of the tree, and selecting "Tree Node" determines what is displayed in the data panel. Menu 401 and Toolbar 402 contain both framework-related elements displayed in all context and context-specific elements that are only displayed if their context is selected.

Context Selector 403 is the highest level of application control. Selecting the context influences the appearance all other elements of the UI. On-line configuration, off-line configuration and configuration wizards are possible examples of different contexts. As described herein, an "on-line configuration" designates an application that provides immediate usage model. User modifications to the UI are applied to the device either immediately or on demand. WEB-based solutions are usually examples of on-line configuration. The on-line system cannot function without live connection to configured device. An "off-line configuration" designates an application that operates in import, modify, export modes. The user operates on a copy of a configuration data, and changes are applied as a part of a scheduled action. Configuration data is verified without real device participating in the process. An off-line system is useful for large-scale configuration modification. It does not provide monitoring capabilities since it does not require live connection to configured devices. Hierarchy Panel 404 provides a basic navigation mechanism that allows for the selection of functional areas or specific configuration objects. The structure of Hierarchy Panel 404 depends on the network element currently being managed.

Data Panel 701 (shown in FIG. 7) displays configurable data. A small number of standard layouts are provided, such as a list browser. The number of standard layouts may be intentionally kept small in order to promote a uniform look and feel. However, the standard layouts can be customized and extended by code included in a device-specific Cartridge 408. The Details Panel 405 is a subset of the Data Panel 701 which, in the example shown in FIG. 7, shows the information pertaining to the Row 702 selected in the table shown in the top half of Data Panel 701. In selected cases, some panels may not be displayed. For example, the context panel may not be displayed if only one context is registered. However, the menu/toolbar, Data Panel 701 and status bar are likely to be displayed all or most of the time.

The GUI Engine 406 interprets View Specification 407 (from Cartridge 408) and builds models and views for all the visual elements. The GUI Engine 406 is responsible for maintaining all main window panels and GUI widgets. In response to user actions such as selecting the context or selecting objects in widgets hierarchy, the GUI Engine 406 instantiates Data Panels 701, menu bar elements and status bar elements. The general working of GUI Engine 406 follows the model-view-controller pattern. GUI Engine 406 provides a view and a controller part. It creates model elements based on data model references contained in View Specification 407.

GUI Engine 406 is extensible. More specifically, pluggable services provide contexts that take control of the menu bar, status bar and Hierarchy Panel 404. The structure of Hierarchy Panel 404, and the contents and layout of the Data Panel 701, is specified by View Specification 407. GUI Engine 406 offers built-in support for a small number of standard Data Panel 701 layouts including a simple panel and a list browser. A simple panel (with optional tabs) displays data contained in multiple tabbed panes. Each tab can have a different layout that can be selected from layouts provided by GUI Engine 406 or defined explicitly by Cartridge 408. A List Browser includes a table in the top half (with optional tabs) and an optional details panel in the lower half of the Data Panel 701. It also includes an optional "Filter" area that allows the user to choose which objects to display in the table. The selection in the table determines the contents of the details panel below it.

GUI Engine 406 provides an extension mechanism that allows View Specification 407 writers to modify a standard layout or to define custom layouts. View Specification 407 contains references to a Data Model Definition 409. These references enable the GUI Engine 406 to interact with the Data Engine 302 in order to retrieve and update the configuration data that is displayed on the screen. GUI Engine 406 can display multiple Data Panels 701 concurrently. Multiple windows can be displayed, presenting data in the same or different data objects. The View Specification 407 language fulfills two tasks: describing navigation patterns, and describing the layout of Data Panels 701.

Navigation parts of the language describe what elements are represented as tree nodes in Hierarchy Panel 404 and what are placed in the Data Panel 701. They also describe the navigation hierarchy. Each level of the hierarchy is defined by providing a way of constructing it; i.e., class of components visible on this level or the description of the operation that needs to be called to retrieve the components from the Data Engine 302. Purely navigational components that do not have to be retrieved from Data Engine 302 are also defined in the hierarchy view.

At each level of the tree, the invention allows for specifying if components on that level are displayed in Hierarchy Panel 404 or in the Data Panel 701. Each component can be conditionally hidden. Conditions for visibility of components are based on information received from the Data Engine 302. Panel description parts of the language specify which fields are displayed on which panel, and what layout should be used to display these fields. A "field" is defined herein as the smallest configurable data item provided by a device and accessible through the configuration protocol. Each component can have a set of panels. Each panel has a title and panel description that contains a set of operations that are available when the panel is displayed, for example, Refresh (all panels) or Apply (for panels that do not have auto-submit functionality).

Each panel is composed of sections. Sections roughly correspond to Group GUI widget, however, they do not have to be visible for the end user. By default, sections are laid out vertically, but other arrangements can be specified. Every section may, optionally, include a title. There are several types of sections including, for example, but not limited to, a section that displays fields in multi-column fashion or in a grid. Additionally, new types of sections can be defined by Cartridges 408.

Every section or the entire panel can also be hidden. Conditions for visibility of sections and panels are based on information received from Data Engine 302. Data Engine 302 is at the center of the architecture. It provides transport, presentation, localization and an independent way of accessing, modifying, retrieving and storing of device data. Because the exact structure of the data is device specific, Data Engine 302 provides just the strategies and algorithms for handling the data, leaving the description of the data schema, its visual elements and transport adaptors to be specified by device dependent Cartridges 408.

To ensure independence from presentation technology and transport mechanisms, Data Engine 302 communicates with the external world by allowing the presentation layer and the transport layer to create adaptor components. In the case of GUI access, these translators reside in the presentation layer and constitute data models in a sense of model-view-controller patterns. All presentation layer adaptors access the data through the Data Engine API 410. All transport adaptors support Transport Adaptor API 414, which Data Engine 302 uses to interface with the device (or database). Each data object in Data Engine 302 can have multiple presentation models. However, only one transport adaptor is connected to it at any given moment. The specific implementation may allow for switching transport adaptors on the fly and thus allowing Data Engine 302 to transport configuration data, for example, between a database and the real device. A single Data Engine 302 may be used in all contexts; however, different cartridges used in different contexts would usually result in a different data kept by the engine.

Figure 5:
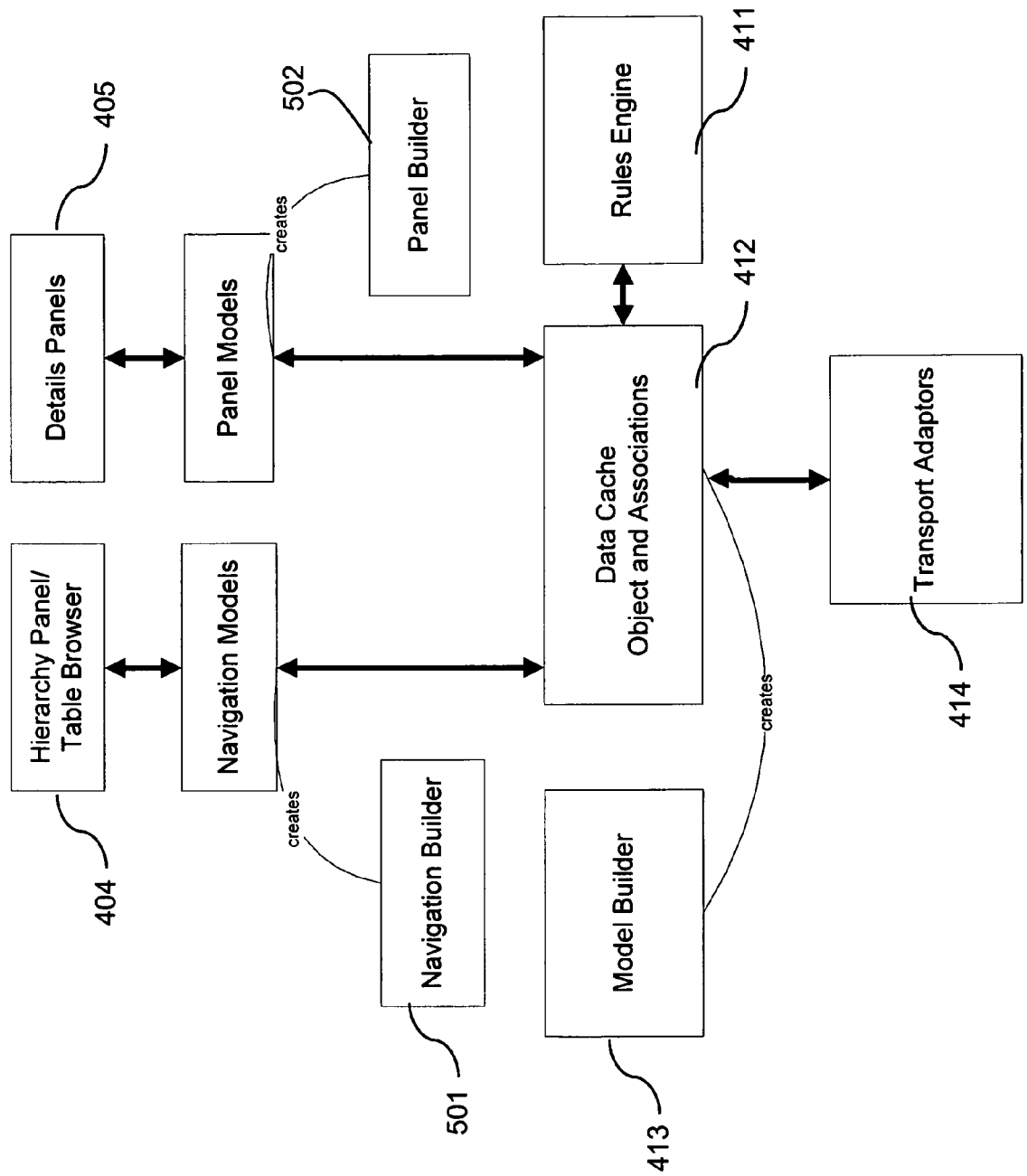
FIG. 5 is a schematic diagram of the data engine interactions of the present invention.

Functional blocks represented in FIGS. 4 and 5 do not necessarily represent independent software modules. For example, Rules Engine 411 includes description that should be viewed as a functionality description only; designers of Data Engine 302 may choose to incorporate this functionality directly in data object or choose yet another solution. The data cache or Data Model 412 is a store for all objects and associations representing a configured device. It is created based on the information retrieved by transport adaptors directly from the device or from the database. Data Cache 412 provides a querying mechanism allowing other services to obtain the list of all objects, the list of objects of a specific class, or a specific object if a unique identifier of this object is provided.

The data engine implementation does not have to keep all data objects active and instantiated in memory at all times. The object or associations can be instantiated when requested by other modules or services. The Model Builder 413 is the module that externalizes the algorithm of building a data object in the data cache. It contains the factories for all data objects and executes algorithms for querying the device or database. Model Builder 413 is driven by the data model definitions provided in the device cartridge.

Navigation and Data Panel Builders 501, 502 are modules that are responsible for creating models for visual representation of the data. The Navigation Builder 501 creates hierarchy models that are later displayed as trees or browsing tables. The Panel Builder 502 creates models for panels and fields. Both builders are driven by the GUI description language. Rules Engine 411 is used to evaluate rules, expressions and conditions defined in the data model. During the evaluation process, Rules Engine 411 may require some additional information that is retrieved from the device or from the database.

One of the applications of Rules Engine 411 is ensuring data consistency. When Data Engine 302 receives requests to change data values, it requests the Rules Engine 411 to verify if the change is acceptable. Rules Engine 411 invokes the set of rules specified in Cartridge 408, for example, in either model definition language or Java. Only if none of the rules vetoes the change is a new value accepted by the engine.

The Transport Adaptor 414 (in Cartridge 408) mediates between the Data Engine 303 and the transport protocol. Again, this could be merely an identifier for a protocol, or an actual implementation of a protocol. Separate transport adaptors can be provided for each transport protocol. Transport Adaptor 414 encapsulates all transport-related dependencies between data. It retrieves transport dependent identifiers from the object and fields, re-orders parameters, translates between internal and "wire" representation of values if necessary, handles transaction and error notification making all protocols appear in the same way to the data engine. Transport Adaptor 414 is extensible in the same way as Navigation Builder 501 or Model Builder 413.

There is a continuum of how much of the implementation of Transport Adaptor 414 needs to be in Cartridge 408; anything from a mere identifier to a complete implementation. If a Transport Adaptor 414 is identified (rather than implemented) in Cartridge 408, and Transport Protocol Manager 419 does not have it, it can be retrieved in a similar manner to the way that the cartridge management works. The data objects and associations contained in the engine are instances of objects and associations described in the device model. The data objects represent physical or logical entities of the managed device. Interface, routing protocol, user, and tunnel are just few examples of concepts that can be represented by a data object in the Data Engine 303. Associations represent relations between such entities. Associations always contain references to two or more data objects. Containment (as a relation between physical interface and logical sub interfaces or between users and group of users) is an example of association.

Data objects contain fields and operations. Values of the fields can be set and retrieved and operations can be invoked. Operations fall into two categories, local and remote. Local operations are specified in the data model and are executed by the data engine. Remote operations are executed by sending invoke commands to the device. The Data Engine 302 is isolated from the details of the transport protocol through Transport Adaptor 414. In most cases, the same Transport Adaptor 414 will be used for all data objects but, if necessary, each data object can have its own distinct Transport Adaptor 414. A data object is referenced by one or more GUI models that exist in Presentation Layer 301.

Figure 6:
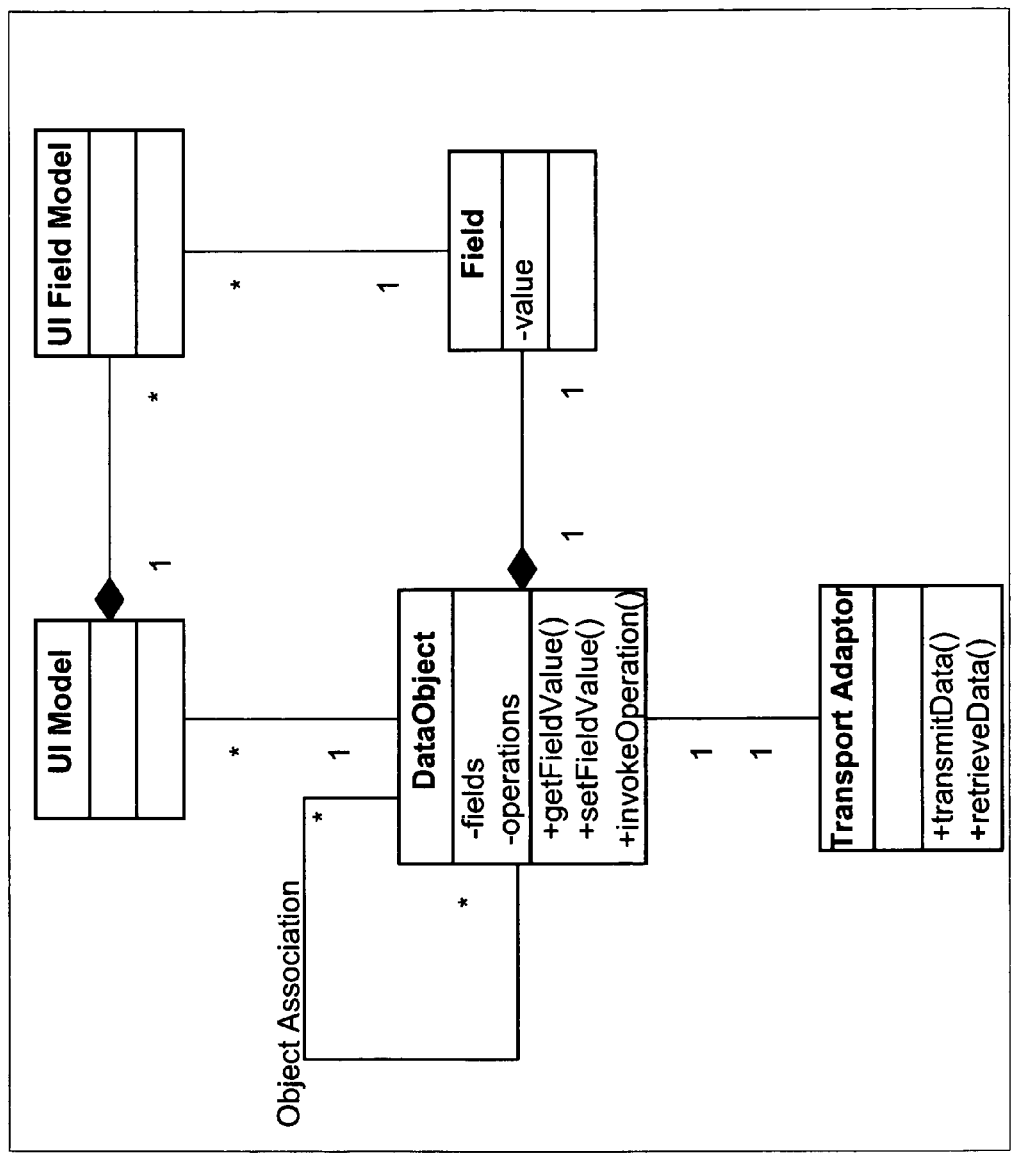
FIG. 6 is a schematic diagram that represents relations between components of the presentation layer, the data engine and the transport adaptor.

FIG. 6 shows a diagram which represents relations between components of the Presentation Layer 301, the Data Engine 302, and the Transport Adaptor 414. It does not imply any specific implementation of the data object and its fields. The Data Engine API 410 provides for setting and retrieving information in the Data Engine 303. Pluggable services are able to set and get the field values, invoke operation, trace association between data objects, and create and destroy data objects and associations. Operations that retrieve collections of data objects are also provided. They support capabilities of querying Data Engine 302 for all objects of specific class.

Data Engine API 410 also provides capabilities of observing the specific data object and notifying whenever its status changes. Data Engine API 410 follows observer pattern, i.e., clients register to be notified when an interesting piece of data changes. Data Engine API 410 is specifically designed to be optimal and efficient for pluggable services and for the UI layer.

The purpose of the data modeling language is to describe the managed device configuration and monitoring capabilities in such a way that this knowledge becomes accessible to Data Engine 302. The data modeling language role is similar to that of SMI/MIB (Structure of Management Information/Management Information Database) in SNMP (Simple Network Management Protocol) and MOF (Managed Object Format) in CIM (Common Information Module).

The data modeling language should not be dependent on any transport protocol used for device configuration, though it needs to provide information that will be used by such protocol to access and modify device configuration. Concepts that may be expressed in this language include components of the managed device such as types and associations, fields for each of the components such as string, integer, and enumeration, constraints such as range for integers, length or regular expression for strings, the operation available for each component (including parameters and return values for each operation), access-level for each field (i.e., not-accessible, read-write, read-only, write-only, write-once), identifiers or other information required by configuration protocol, keys and their format for non-scalar components and other qualifiers such as the add-ability for object and associations, delete-ability, enumeration constraints, instance list filters and instance list labels. The preceding items can be static or dynamic. Dynamic items are expressed as a result of invoking local or remote operation.

The modeling language provides for inheritance to allow for easier enhancing of existing descriptions. The modeling language allows for specifying dependencies between the components and between the fields. For example, it may provide for expressing the notion that access-level of the field may depend on the value of some other field. It is left to the language designer to determine which dependencies are directly supported in a modeling language and which are expressed as extensions written in a programming language such as Java.

The Pluggable Service Registry 304 provides a mechanism for registering services with a central directory. Registering a service makes it accessible from external and internal customers. Specifically, it makes a service accessible to other services. Service declarations are specified via an XML (Extensible Markup Language) descriptor file. The name-service binding, the service type and other service parameters are specified in the service descriptor. Service customers can connect to the service by identifying it with a name and obtaining a handle to a specific instance of a particular service.

The Presentation Layer 301 and the Data Engine 302 described above may be implemented as pluggable services but this is not required. Achieving the most efficient implementation of both GUI Engine 406 and Data Engine 302 is the deciding factor. There are two types of pluggable services, namely, Application-Level Services 415 and Session-Level Services 416. This classification is described in more detail below. Pluggable services can also be classified as Core services and Optional services, and this distinction is also described below.

Application-Level Services 415 are created at start-up by the application loader and remain resident until explicitly closed. One instance of an Application-Level Services 415 is shared by all consumers. Application-Level Services 415 are re-entrant, however, they do not have to be, and generally are not accessible remotely (out-of-process). Application-Level Services 415 do not provide for storing customer state or session state data. Examples of application-level services include Access List Service 418, Naming and Directory Service 417, Cartridge Manager 421, Scheduling Service 424, Logging Service 422, Transport Protocol Manager 419, Database Service, Application Service 423 and Recognition Service 420.

Session-Level Services 416 are services that contain information specific to the consumer that is using the service. Each service instance is created by the client that will use the service, and may contain specific information relevant to the particular client request. For instance, an element management service (session) may be instantiated for a particular device, given the IP address of that device. This session would be different to an element management session on another device, and thus, a separate instance for each "client" using the service is necessary. Examples of Session-Dependent (or session-level) Services 416 are Element Management Session, File Management Service 426, Export/Import Service 427, and Comparison Service.

Small management applications and full management applications are constructed by packaging the Framework 101 and a set of pluggable services. Some services are common to both the small and the full product. Some of the services can be optionally distributed. There is a core set of services that has to be part of all products, and there are some optional services that can be provided only if the product requires additional functionality. Examples of core services may include Naming and Directory service 417. Pluggable Service Registry 304 uses the naming service to locate the service handle based on a registered name. This service is used to isolate the task of locating other services and thus reduces the dependencies between services and allows for location and execution transparency. Another example of core services may include the Naming and Directory Service, which implement one of the industry APIs, such as Java Naming and Directory Interface (JNDI).

Still another example of a core service is an Access Point List Service 418. In this service, each device configured by the management application constitutes an access point. The list of access points should be persistent even if the management application has an on-line context only. Access Point List Service 418 provides storage for the access point lists. It allows other services to list, create and delete access points. Only one access point list service is present and active at any given moment. Several different implementations of this service are possible. At least one lightweight implementation should not require the database (DB) management system to provide storage capabilities.

Transport Protocol Manager 419 is another exemplary core service. At the minimum, a single configuration protocol (which may also be called a transport protocol), needs to be available for transporting communication information to and from the device. This protocol is actually an application protocol from the OSI model. However, it is used to "transport" the data to the device (hence it sometimes referred to as a transport protocol). Legacy support protocols such as SNMP or CLI are also supported with the use of pluggable transport protocol modules. The transport protocol manager facilitates the discovery and use of these protocols.

Recognition Service 420 is yet another core service example. Cartridge Manager 421 requires certain information about device type, installed software and supported configuration protocol before it can choose which cartridge should be used to manage the device. All devices supported by Framework 101 need to be able to provide basic information about device hardware and software version, or some other information which will enable identification of the correct cartridge to be used. The task of the recognition service is to obtain this information from the device. Recognition Service 420 may be enhanced using modules that support specific boot-strap protocols.

Before the configuration application starts managing the device it needs to identify which cartridge should be used for a device. Selecting the best cartridge is a two-step process that is performed by a cartridge selector. The first step requires gathering information about the device type and version of the software installed on the device. This information can be provided by the user or retrieved from the device with the help of the recognition service (see above). The second step involves downloading the cartridge from the device itself, or from externally available on-line repository. The cartridge that is the best match for a device is subsequently chosen and used to manage the device. Matching the cartridge to the device, loading the cartridge, and distributing its parts to the services that are extended by the specific cartridge are the most important functions of cartridge manager.

Logging Service 422 is still another exemplary core service. Logging Service 422 is used by all remaining services to provide a configurable logging functionality. Services register with Logging Service 422 as either producers or consumers of logging entries. Each entry contains the specification of severity, category and event description. Logging Service 422 can be configured to provide permanent storage only for entries with a specific category or severity. Log consumers can request Logging Service 422 to filter the entries based on a similar set of criteria. Consumers of Logging Service 422 are offered both access to historic log data, as well as on demand notification mechanism for current events. The functionality of Logging Service 422 is used by other services in Framework 101 and not by the device. It should not be mistaken with functionality provided by SYSLOG and similar services. The Logging Service 422 may follow industry standard solutions such as the Java Logging API introduced in JDK 1.4.

The Application Service ("Element Manager") 423 provides the main thread of control. It displays the main window, instantiates context plug-ins. and binds together other services that comprise the management application. Application Service 423 determines the personality of management application. One service implementation is required for light weight, one context, on-line application, and another service implementation for the full client-server application that also supports off-line configuration. The Application Service 423 is a module that takes control after the application loader registers and initializes all services enumerated in the application descriptor.

Examples of optional services may include a Persistence Service 425. The Database Management Service is offered to provide support for off-line storage of configuration information. Persistence Service 425 is not directly accessed by the data engine. Instead, the database adaptor that implements the same interface as other transport adaptors handles the details of transforming the on-line configuration data into the off-line database representation. The Database service interface may follow industry standard solutions such as Java Data Base Connectivity (JDBC).

Import/Export Service 427 is another example of an optional service. Bulk data transfer between Persistence Service 425 and network elements is handled by Import/Export (or Export/Import) Service 427. This service may be extended by the cartridge to allow for variations between different device types. The Import/Export Service 427 should use the device's on-line Transport Adaptor 414 to exchange data with the device.

File Management Service 426, another exemplary optional service, allows for transferring all types of files between a local file system and the device file system. File Management Service 426 offers several transfer protocols that might include TFTP, FTP or a Network File System. Service customers need to specify the location and the destination of the file—only protocol dependent operations are handled by the service. File Management Service 426 is used for configuration backup, image and configuration update, log files transfer, and others requiring transfer of data files.

Scripting Service 428 exports the public interfaces of other services in the form of command line scripting language similar to Bourne shell. Scripting Service 428 should not be mistaken with CLI that may be offered by network element. Scripting Service 428 is used for controlling (e.g., automation of) applications. It can be used internally for testing automation and externally for the purpose of extending and automating configuration capabilities. This service provides the command line interface to the management application.

Scheduling Service 424 provides other services with a capability of executing specified operations periodically or once at a specified point in time. Customers register schedules (a sequence of points in time) and details of the operation that should be performed. Scheduling Service 424 can be used for both one time events (such as a software upgrade) and periodic events (such as a weekly configuration backup).

FIG. 4 also shows a Cartridge 408. Examples of elements which may be included in a cartridge include View Specification 407, Data Model Description 409, Transport Adaptors 414, and Algorithms for Optional Services 429. View Specification 407 is expressed in the view specification language with optional extensions in Java. This describes navigation and contents of the Hierarchy Panel 404 and Data Panel 701.

Data Model Description 409 is expressed in the data modeling language with optional extensions in Java. The Data Model Description 409 describes the device components and relationships between these components. The data model part of the cartridge is used to drive data engine.

Transport Adaptors 414 are classes that encapsulate transport specific properties of data object models. Transport Adaptors 414 allow for transformation of object representation from the internal data engine format into the format accepted by the transport mechanism. However, the cartridge does not necessarily contain the transport protocol implementation. By providing transport adaptors it allows the data engine to bind each object to the required transport protocol, i.e., it can contain the transport protocol implementation or alternatively a reference to the transport protocol to be used. This is more efficient as many elements may use the same transport protocol. Where Transport Adaptor 414 includes a reference to the protocol, Framework 101 may check whether it already has the required protocol implementation information and, if not, Framework 101 can obtain the information from a web site, central server or other suitable source.

Algorithms for Optional Services 429, contain algorithms for transferring data between the data base and real device. The behavior of the management application is determined by the set of device-specific cartridges. Cartridge developers employ mostly declarative approach, i.e., describing the properties of the managed device (such a supported configuration parameters and their dependencies). Only selected cases (extensions) are separately coded in imperative. The role of Framework 101 is to interpret this description and provide management support for the device.

Several description methods or languages may be used to describe device parameters, verification rules, screens hierarchies etc. All description methods may use XML syntax. The data-driven (declarative) approach should be able to provide cartridge developers with enough functionality to support at least 80% of device features. The remaining functionality may be supported by extending the data and UI descriptors with Java classes. Java extensions are called during run-time with the aid of the Java reflection mechanism.

There are several stages in cartridge development including modeling, enhancing the model, generating the cartridge, and deployment. The modeling stage includes describing the management capabilities of the device, describing all the device components, such as the configuration and statistics fields, describing the verification rules and the relationships between components and fields, and grouping fields and defining views. The stage of model enhancement includes the rules, views and dependencies that cannot be expressed in declarative way and are expressed in Java.

The cartridge generation stage involves applying a tool that parses, compiles and packages model description and model enhancement into cartridge software module. Thus, ideally, both off-line and on-line cartridges are created at this stage from the same set of sources. The deployment stage includes packaging the set of cartridges, pluggable components and Framework 101 into element management application or, alternatively, installing cartridges on devices for automatic deployment or installing them at a central resource for access by Framework 101 when required.

The following description describes a number of possible scenarios utilizing the present invention. A first scenario involves starting the management application, for an on-line scenario. First, Application Loader 305 instantiates Pluggable Service Registry 304 and Naming and Directory Service 417. Application Loader 305 locates, instantiates and initializes all application level services specified in the application description files. Application Loader 305 instantiates Application Service 423 and passes control to it. Application Service 423 then locates GUI Engine 406 and the presentation engine. Application Service 423 creates an application main window, locates all context services and request adding context based UI elements. The default context is also requested to provide hierarchy panel GUI. Application Service 423 then starts an UI user thread.

In a second scenario, starting a management session for a new device, Application Service 423 retrieves the list of configuration protocols from Transport Protocol Manager 419, in which each protocol may have a different set of required access information. Application Service 423 then solicits protocol-dependent access information (for example IP Address, user name password, certificate etc.) from the user. Recognition Service 420 communicates with newly added device and retrieves device type, software and hardware version and other hints that facilitate selection of proper cartridge. Optional Recognition Service 429 then downloads the cartridge from the device.

Cartridge Manager 421 selects the cartridge that will be used to manage the device from the set of cartridges statically distributed with Framework 101 or downloaded from the device or from well-known network location. GUI Engine 406 processes the GUI navigation description from the cartridge and creates navigation models. Cartridge Manager 421 then initializes GUI model builders provided by the cartridge, and the GUI model builders request information from Data Engine 302.

Data Engine 302 initializes the model builder provided by the cartridge. The model builder instantiates Transport Adaptor 414 for each data object that it needs to create. The "model builder" refers to the mapping between data object type and Transport Adaptor 414 in order to instantiate a proper transport adaptor. The model builder attaches Transport Adaptor 414 to newly created data objects and initiates configuration data retrieval. Once data objects are initialized, information is returned to GUI Engine 406. GUI Engine 406 then creates UI models and displays data panels based on the selected hierarchy components.

In yet another scenario, a new device can be added in an off-line setting. In this scenario, Application Service 423 retrieves the list of supported devices types and presents users with an option to select a specific device type. GUI Engine 406 processes a GUI navigation description from the cartridge and creates navigation models for a newly selected device Application Service 423 GUI Engine 406 then initializes GUI model builders provided by the cartridge and the GUI model builders then request information from Data Engine 302. Data Engine 302 initializes a model builder provided by the cartridge where the model builder instantiates a database transport adaptor for each data object that it needs to create. Once data objects are initialized, information is returned to GUI Engine 406. GUI Engine 406 creates UI models and displays data panels based on the selected hierarchy components.

Another scenario involves the modification of a parameter in an on-line context. The user changes the field value and GUI Engine 406 controls the Presentation Layer 301, which performs basic field level validation (enumeration field, regular expression or range checking). This validation is limited to the capabilities of the UI widget. Presentation Layer 301 translates between UI representation and data-engine representation of the data (this step involves, among other things, resolving localized names), calls a data engine function, and passes new field values.

Data Engine 302 then validates the data by executing all rules associated with the modified data item. If new data item cannot be approved, GUI layer is notified, and data is not sent to the device. Data Engine 302 then calls Transport Adaptor 414 to send the new value to the device. If necessary, Transport Adaptor 414 calls a transport protocol after translating the values to protocol-dependent format. The device accepts or rejects the change. In case of errors, Data Engine 302 is notified through Transport Adaptor 414. GUI Engine 406 provides feedback about the success or failure of the operation based on information received from Data Engine 302.

Another scenario addresses the modification of a parameter in an off-line context. Modification of the value in an off-line context is similar to an on-line context. The difference lies in special transport adaptors that are connected to the database and not to the transport protocols. Transferring data between a database and devices may use an export/import mechanism that does not have to involve Transport Adaptors 414 or Data Engine 302.

Although usage of specific technologies is not required by the invention, some suitable technologies are mentioned in the description by way of example only. It will be clear to a person skilled in the art that the architecture, method of operating the Element Manager and other aspects of the invention are independent from the choice of technology for implementation.

A suitable development language is Java, due to the wide availability of libraries and tools, especially in the realm of network-related applications and the requirements of support for diverse set of operating system, including Unix-based systems. Other Java-related technologies and specifications may also be used in designing Framework 101 including, but not limited to, JDBC, JNDI and Enterprise Java Beans (EJB).

A suitable data description language is XML and it is possible to use a domain-specific syntax. XML is an appropriate language because of its extensibility, good support in Java environment, abundance of parsing and transforming tools, and industry support for XML-based standards. Its self-documenting features, i.e., support for schemas describing syntax and context relationships, are also a useful aspect. Framework 101 is preferably protocol independent. The architecture provides for pluggable protocol stacks and protocol adaptors that encapsulate protocol-specific code, and hide the differences between protocols from the rest of Framework 101.

RPC-based, lightweight protocol is a suitable solution for element configuration. An example of a data schema (part of a Data Model) and an example of a view specification for an exemplary managed element is provided in U.S. Provisional Patent Application Ser. No. 60/679,896, filed May 11, 2006 entitled METHOD OF MANAGEMENT AND DISTRIBUTION OF DEVICE ADAPTERS FOR ELEMENT MANAGEMENT SYSTEMS, the entirety of which is incorporated herein by reference.

Although the above description relates to a network Element Manager for use in OAM, the apparatus and methods described above can also be applied to other applications which require management/control of or communication with various types/versions of equipment elements by a centralized client.

It will be understood that the above description of a preferred embodiment is given by way of example only and that various modifications may be made by those skilled in the art without departing from the spirit and scope of the invention.

The present invention can be realized in hardware, software, or a combination of hardware and software. An implementation of the method and system of the present invention can be realized in a centralized fashion in one computing system, or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein and which, when loaded in a computing system, is able to carry out these methods. Storage medium refers to any volatile or non-volatile storage device.

Computer program or application in the present context means any expression, in any language, code or notation, of a set of instructions intended to cause a system having an information processing capability to perform a particular function, either directly or after either or both of the following (a) conversion to another language, code or notation; and/or (b) reproduction in a different material form. In addition, unless mention was made above to the contrary, it should be noted that all of the accompanying drawings are not to scale. Significantly, this invention can be embodied in other specific forms without departing from the spirit or essential attributes thereof and accordingly, reference should be had to the following claims, rather than to the foregoing specification, as indicating the scope of the invention.

What is claimed is:

1. A network element management system for managing network elements in a communication network, each of the network elements including at least one component, the network element management system comprising:
   a storage device configured to store:
      one or more cartridges, the one or more cartridges containing network element-specific information corresponding to a network element, the network element-specific information including a description of a relationship between the at least one component of the network element;
   a generic framework defining a set of software components for building the element management system, the generic framework including a data engine, the data engine including:
      a data model configured to store objects and associations representing a managed network element; and
      a model builder configured to externalize an algorithm of building a data object in the data model;
   the generic framework configured to:
      determine whether the generic framework contains the cartridge, the cartridge being an installed cartridge, each cartridge including a protocol selection module for selecting a protocol to be used when communicating with a particular network element, the generic framework connecting to and managing the selected network element using the installed cartridge;
      store data independent of the protocol selected by the protocol selection module,
      retrieve data independent of the protocol selected by the protocol selection module; and
      provide an application program interface for storing and retrieving managed data;
      determine whether a first cartridge for a first network element is available in the storage unit; and
      when the first cartridge is not available in the storage unit, obtain the first cartridge directly from the first network element; and
   a processor, the processor configured to use the one or more cartridges and the generic framework to manage the one or more network elements.

2. The network element management system of claim 1, wherein the generic framework includes a graphical user interface engine for presenting a graphical user interface for all network element types.

3. The network element management system of claim 1, wherein the generic framework includes a data engine for maintaining a data model, the data model being a representation of the managed network elements, the data engine comprising data objects that include instances of objects described in the data model.

4. The network element management system of claim 1, wherein the generic framework is configured to obtain the cartridge from a computer readable medium of the first network element.

5. The network element management system of claim 1, wherein the identity of a cartridge includes a cartridge identifier and a version identifier.

6. A method of managing network elements in a communication network, each of the network elements including at least one component, the method comprising:
   coupling a generic framework to a network element, the generic framework defining a set of software components, the generic framework including:
      a data engine, the data engine including:
         a data model configured to store objects and associations representing a managed network element; and
         a model builder configured to externalize an algorithm of building a data object in the data model;
   querying, by the generic framework, the network element to determine the identity of an element-specific cartridge, the element-specific cartridge containing network element-specific information corresponding to the network element, the network element-specific information including a description of a relationship between the at least one component of the network element; and
   obtaining the element-specific cartridge from the network element,
   the generic framework connecting to and managing the network element via use of the obtained element-specific cartridge, and the element-specific cartridge including a protocol selection module for selecting a protocol to be used when communicating with a particular network element, and the generic framework further including:
      a data store to store data independent of the protocol selected by the protocol selection module; and
      a retrieval component to retrieve data independent of the selected protocol.

7. The method of claim 6, wherein the element-specific cartridge includes a protocol selection module for identifying the protocol to be used when communicating with a particular network element.

8. The method of claim 6, wherein the generic framework includes a graphical user interface engine for presenting a graphical user interface for all network element types.

9. The method of claim 6, wherein the generic framework includes a data engine for maintaining a data model, the data model being a representation of the managed network elements, the data engine comprising data objects that include instances of objects described in the data model.

10. The method of claim 6, wherein the generic framework obtains the cartridge from a computer readable medium of the network element.

11. The method of claim 6, wherein the identity of an element-specific cartridge includes a cartridge identifier and a version identifier.

12. A non-transitory storage medium storing a computer program which when executed by a processing unit performs a method for managing network elements in a communication network, each of the network elements including at least one component, the method comprising:
   coupling a generic framework to a network element, the generic framework defining a set of software components, the generic framework including:
      a data engine, the date engine including:
         a data model configured to store objects and associations representing a managed network element; and
         a model builder configured to externalize an algorithm of building a data object in the data model;
   querying, by the generic framework, the network element to determine the identity of an element-specific cartridge, the element-specific cartridge containing network element-specific information corresponding to the network element, the network element-specific information including a description of a relationship between the at least one component of the network element; and
   obtaining the element specific cartridge from the network element,
   the generic framework connecting to and managing the network element via use of the obtained element-specific cartridge and the element-specific cartridge including a protocol selection module for selecting a protocol to be used when communicating with a particular network element, and the generic framework further including:
  a data store to store data independent of the protocol selected by the protocol selection module; and
  a retrieval component to retrieve data independent of the selected protocol.

13. The storage medium of claim 12, wherein the generic framework includes a graphical user interface engine for presenting a graphical user interface for all network element types.

14. The storage medium of claim 12, wherein the generic framework includes a data engine for maintaining a data model, the data model being a representation of the managed network elements, the data engine comprising data objects that include instances of objects described in the data model.

15. The storage medium of claim 12, wherein the generic framework obtains the element-specific cartridge from a computer readable medium of the network element.

* * * * *